United States Patent Office 2,861,987
Patented Nov. 25, 1958

2,861,987

NEW DIPHENYL METHANE- AND 1-AZA-[2,3:5,6]-DIBENZOCYCLOHEPTADIENE DERIVATIVES, THEIR ACID SALTS AND QUATERNARY SALTS AND THE PRODUCTION THEREOF

Henry Martin, Zurich, and Ernst Habicht, Schaffhouse, Switzerland, assignors to Cilag Limited, Schaffhausen, Switzerland, a Swiss company No Drawing. Application December 27, 1956
Serial No. 630,777

Claims priority, application Switzerland
December 28, 1955

6 Claims. (Cl. 260—239)

This invention relates to new diphenyl methane- and 1-aza-[2,3:5,6]-dibenzocycloheptadiene derivatives, their acid salts and quaternary salts and the production thereof.

It has been found that diphenyl methane derivatives of the general formula

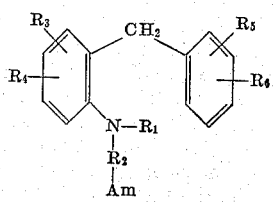

(I)

and 1-aza-[2,3:5,6]-dibenzocycloheptadiene derivatives of the general formula

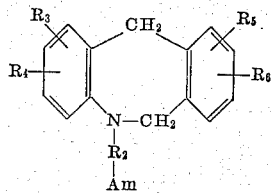

(II)

are valuable pharmaceutical agents. They can for example be used as anti-histamines, for generally moderating the vital functions, such as for example lowering of the blood pressure, the pulse and breathing rate and the body temperature, and also as analgesics.

In the aforementioned general Formulae I and II the symbols have the following significances:

$R_1$ is a lower aliphatic radical,
$R_2$ is a lower straight or branched chain alkylene radical with 1–4 carbon atoms,
Am is a secondary, tertiary or quaternary amino group, preferably a dialkylamino, pyrrolidino, piperidino or morpholino group, $R_3$, $R_4$, $R_5$, $R_6$ are hydrogen atoms, lower alkyl or lower alkoxy radicals or halogen atoms.

The compounds of Formula I are produced by processes known per se, by introducing an aminoalkyl radical Am—$R_2$— in a single-stage or multi-stage process into a diphenyl methane derivative of the general formula

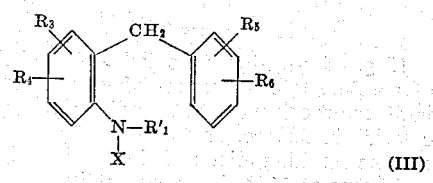

(III)

in which X is a hydrogen or metal atom and $R'_1$ is an alkyl or acyl radical, or by introducing the alkyl radical $R_1$ into a diphenyl methane derivative of the general formula

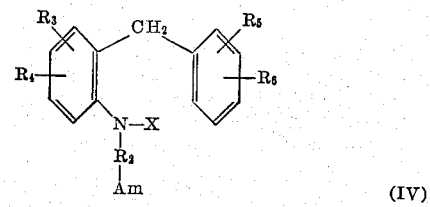

(IV)

by processes known per se.

It is for example possible for the radical Am—$R_2$— to be introduced into a phenyl methane derivative of Formula III (in which $R'_1$ is an alkyl radical and X is a hydrogen or metal atom) with the aid of reactive esters of amino alcohols, for example hydrogen halide esters.

The following can be used as amino alcohol esters: dimethylaminoethyl chloride, diethylamino-ethyl chloride, 2-dimethylamino-propyl chloride, 3-dimethylamino-propyl chloride, piperidinoethyl chloride, pyrrolidinoethyl chloride, pyrrolidinopropyl chloride, 1-methyl-3-bromopiperidine, 1-methyl-4-bromo-piperidine, 1-methyl-piperidyl-3-bromo-methane, 3-bromomethyl-1-methyl-pyrrolidine and compounds of similar structure as well as their homologues.

It is also possible to introduce the radical Am—$R_2$— into a diphenyl methane derivative of Formula III (in which $R'_1$ is an acyl radical and X is a hydrogen or metal atom) by the aforementioned methods and thereafter to convert the acyl radical $R'_1$ by known methods into the corresponding alkyl radical $R_1$ for example by means of lithium aluminium hydride or aluminium-hydrocarbon hydrides.

Other methods which are known in the art are also available for the introduction of the Am—$R_2$— radical. For example, a halogenoalkyl radical can be introduced into a diphenyl methane derivative of Formula III (in which $R'_1$ is an alkyl or acyl radical and X is a hydrogen or metal atom) with the aid of dihalogenoalkanes and the halogen radical in the halogenoalkyl derivatives which are obtained (or similarly substituted derivatives, such as for example alkyl or aryl sulphonyloxyalkyl derivatives) can be replaced by the required amine radical by reaction with primary, secondary or tertiary amines.

It is also possible to introduce the AM—$R_2$— radical by amino-acylation of diphenyl methane derivatives of the general Formula III with subsequent conversion of the acyl group into the methylene group.

The halides or anhydrides of diethylamino-acetic acid, diethylamino-propionic acid, pyrrolidino-acetic acid, pyrrolidino-propionic acid, 1-methyl pyrrolidine-3-carboxylic acid, 1-methyl piperidine-3- or -4-carboxylic acid are examples of suitable aminoacylating agents.

The Am—$R_2$— radical can also be introduced into a diphenyl methane derivative of the general Formula III by reacting the latter with halogenocarboxylic acid amides or α,β-unsaturated paraffin-carboxylic acid amides, with subsequent reduction of the carbonamide group in the carbamidoalkyl derivatives obtained by using the methods described above.

The following are examples of halogenocarboxylic acid amides which can be used for introducing the carbamidoalkyl group: chloracetic acid dimethyl amide, chloracetic acid diethyl amide, chloracetic acid pyrrolidide, chloracetic acid piperidide, chloracetic acid morpholide, α-chloropropionic acid dimethyl or diethyl amide, α-chloropropionic acid pyrrolidide, piperidide or morpholide, and β-chloropropionic acid dimethyl or diethyl amide. Instead of the halogen-carboxylic acid amides, it is of course also possible to use similarly substituted carboxylic acid amides, such as for example hydroxy paraffin carboxylic acid amides esterified with alkane sulphonic acids or aryl sulphonic acids.

For introducing the carbamido-ethyl or carbamido-propyl radical it is also possible to use correspondingly N-substituted acrylic acid or crotonic acid amides, in the double bond of which it is readily possible to incorporate the amino group of the diphenyl methane compound.

Depending on the method of introduction of the Am—R₂— group, the radical R′₁ in the diphenyl methane derivatives which are thus obtained and which contain a di-substituted amino group can, if it is an acyl radical, be converted simultaneously or if desired subsequently by appropriate reducing agents into an alkyl radical.

Another possible method of introducing the Am—R₂— radical into the diphenyl methane derivatives is first of all to introduce a radical containing a carbonyl group into a compound of the general Formula III, and to convert this carbonyl group in the condensation product which is obtained into the required Am— group by means of reducing agents and amines. It is for example possible for a substance of the general Formula III to be reacted with a halogenoketone, vinyl ketone or halogenoaldehyde, and for the compounds obtained to be treated in the presence of primary or secondary amines with reducing agents, preferably catalytically activated hydrogen.

The aforementioned methods can also be used for introducing the radical R₁ into a compound of the general Formula IV in which X is a metal atom, i. e. direct alkylation by means of reactive esters of alkanols, alkenols or alkynols, or acylation by methods which are known for acylation purposes and subsequent reduction of the carbonyl group of the acyl radical which is introduced to form the methylene group.

The basically substituted diphenyl methane derivatives which are thus obtained can also be isolated and applied in the form of their salts with acids or acid reacting compounds. Examples of acids or acid reacting compounds which are suitable for forming the salts are sulphuric acid, hydrochloric acid, hydrobromic acid, phosphoric acid, citric acid, tartaric acid, methane sulphonic acid, ethane disulphonic acid, hydroxyethane sulphonic acid, succinic acid, fumaric acid, maleic acid, benzoic acid, salicylic acid, p-aminobenzoic acid, p-aminosalicylic acid, or halogenoxanthines, such as for example 8-chloro-theophyllin.

The basically substituted diphenyl methane derivatives concerned can also be converted into quaternary salts if the substituent Am is a tertiary amino group.

Alkyl halides, alkyl sulphates, alkyl sulphonic acids, alkyl esters, aralkyl halides and alkenyl halides are examples of suitable quaternisation agents.

Instead of the o-amino-diphenyl methane compounds, it is also possible for o-aminobenzophenones to be aminoalkylated or alkylated in the manner described above. After the introduction of the Am—R₂— or R₁— groups, the carbonyl group of the substituted benzophenone can, if desired simultaneously with a carbonamide-group (as a preliminary stage of Am—R₂—) be converted into the CH₂ group. This conversion is effected by means of conventional reducing agents, such as lithium aluminium hydride.

It is possible to use the following method for the production of the 1-aza-[2,3:5,6]-dibenzocycloheptadiene derivatives: the radical Am—R₂ is introduced, by the methods previously described for the production of the diphenyl methane derivatives, into a compound of the general formula

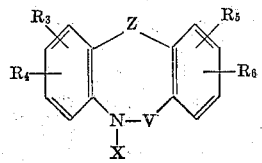

in which Z and V are CH₂ groups or groups which can be converted into CH₂ groups by reduction, and if necessary the groups Z and/or V are thereafter reduced by means of suitable reducing agents.

For example, by means of this process the lactam of 2-aminobenzophenone-2′-carboxylic acid, if desired after previous conversion into an alkali metal salt, can be aminoalkylated by known methods as initially described and thereafter the groups Z and V converted in one or two stages into methylene groups.

Lithium aluminium hydride, lithium borohydride and aluminium hydrocarbon hydrides are examples of suitable reducing agents for this reaction.

The method to be preferred is, however, the introduction of the Am—R₂— radical into the completely formed 1-aza-[2,3:5,6]-dibenzocycloheptadiene. As already mentioned, it is then possible to use the processes which have already been described fully in connection with the production of the diphenyl methane derivatives. It is possible to convert the free aza-dibenzocycloheptadiene, in which case the operation is carried out in the presence of acid-fixing agents, or it is possible to use any alkali metal salt of aza-dibenzocycloheptadiene.

It is for example possible for the radical Am—R₂— to be introduced into a 1-aza-[2,3:5,6]-dibenzocycloheptadiene with the aid of reactive esters of amino alcohols, for example hydrogen halide esters.

The following can be used as amino alcohol esters: dimethylamino-ethyl chloride, mono-ethylamino-ethyl chloride, diethylamino-ethyl chloride, 2-dimethylamino-propyl chloride, 3-dimethylamino-propyl chloride, 3-diethylamino-propyl chloride, piperidino-ethyl chloride, pyrrolidino-ethyl chloride, 2,5-dimethyl-pyrrolidino-ethyl chloride, 3-pyrrolidino-propyl chloride, 3-piperidino-propyl chloride, 3-morpholino-propyl chloride, 1-methyl-3-bromo-piperidine, 1-methyl-4-bromo-piperidine, 1-methyl-piperidyl-3-bromo-methane, 3-bromo-methyl-1-methyl pyrrolidine, 3-bromo-methyl-1-ethyl-pyrrolidine, 1-methyl-4-piperazinyl-ethyl chloride, 1-isopropyl-4-piperazinyl-ethyl chloride.

The aza-dibenzocycloheptadienes obtained in this way can be isolated in the form of their acid salts, as in the case of the diphenyl methane derivatives.

Examples for acids or acid reacting compounds which are suitable for forming salts are: sulphuric acid, hydrochloric acid, hydrobromic acid, phosphoric acid, citric acid, tartaric acid, fumaric acid, methane sulphonic acid, ethane disulphonic acid, succinic acid, fumaric acid, maleic acid, p-amino-benzoic acid, salicylic acid, p-aminosalicylic acid, or halogenoxanthines, such as for example 8-chlorotheophylline.

However, they can equally well be converted into their quaternary salts. The following are examples of suitable quaternisation agents: alkyl halides, alkyl sulphates, alkane sulphonic acid esters or alkane dihalides.

In many cases, it is also possible for the quaternary ammonium group to be introduced directly during the synthesis of the aminoalkyl compounds. For example, the compounds of the general Formula III or IV can be reacted with quaternary ammonium alkyl halides, or the halogenalkyl derivatives of the compounds of the general Formula III or IV can be reacted with tertiary bases, in order to obtain the quaternary salts directly.

The following examples further illustrate the invention.

*Example 1*

15 g. of o-methylamino-diphenyl methane in 100 cc. of absolute toluene are mixed with 3.9 g. of sodamide in 50 cc. of toluene. 12.2 g. of 3-dimethyl aminopropyl chloride in 500 cc. of absolute toluene are then added and the resulting mixture is heated with stirring for several hours at 110° C. After cooling, the reaction solution is submitted to extraction by shaking it with 50 cc. of 2 N sodium carbonate solution and the toluene solution is dried with sodium carbonate and then evaporated to dryness of vacuo. The residue is mixed with 50 cc. of 2 N acetic acid, partial crystallisation taking place (initial product). The crystals are filtered off with suction and washed with 50 cc. of 2 N acetic acid and then with water, and the filtrate is made alkaline with 100 cc. of saturated potassium carbonate solution. The alkaline solution is submitted to extraction with acetic acid and the acid solution is made alkaline with 100 cc. of saturated potassium carbonate solution. The oil that separates out is dried and distilled in vacuo. 5–10 g. of o - (N - methyl - N - 3 - dimethyl aminopropyl)-amino-diphenyl methane are obtained. This substance boils at 140–143° C., at a pressure of 0.09 mm. and is a yellow thinly liquid and acid-soluble oil.

The hydrochloride of the base melts at 136–137° C.

The external methosulphate can be produced from the base with the aid of dimethyl sulphate in ethyl acetate as solvent. This methosulphate melts at 97–98° C.

Example 2

In a manner similar to that described in Example 1, o - (N - methyl - N - dimethyl - aminoethyl) - amino-diphenyl methane is obtained from 36.2 g. of o-methyl amino-diphenyl methane, 9.8 g. of sodamide and 32.5 g. of dimethylamino ethyl chloride in 250 cc. of absolute toluene, the substance obtained boiling at 130–132° C., at a pressure of 0.07 mm. and forming a hydrochloride melting at 183–184° C.

The external methosulphate can be produced by reacting the base (7.7 g.) in ethyl acetate as solvent with dimethyl sulphate (3.6 g.). The methosulphate can also be dissolved in and reprecipitated from isopropanol/ether and melts at 128–129° C.

Example 3

A solution of 25 g. of chloracetyl chloride in 150 cc. of benzene is added dropwise and while stirring and cooling to a solution of 40 g. of o-aminodiphenyl methane and 23 g. of triethylamine in 250 cc. of benzene. After the reaction is complete, the reaction mixture is shaken with 250 cc. of 0.4 N hydrochloric acid and 500 cc. of petroleum ether, the chloroacetyl product which precipitates is filtered off with suction and washed with petroleum ether. After dissolution in and recrystallisation from an ethyl acetate/petroleum ether mixture, there are obtained 39 g. of o-chloroacetamino-diphenyl methane, which melts at 113–114° C.

20 g. of this compound are heated for several hours to boiling point in 150 cc. of benzene with 15 g. of diethylamine. After cooling, the basic substance which is formed is submitted to extraction with dilute acetic acid. The acid solution is made alkaline and the precipitated base is filtered off with suction. 13.5 g., i. e. 62% of the theoretical, of o-diethylamino acetylamino diphenyl methane melting at 67–68° C. are obtained. This substance and its homologues have a strong local anaesthetic effect.

The hydrochloride of the compound can be produced with the aid of ethereal hydrochloric acid and can be dissolved in and recrystallised from isopropanol. This hydrochloride melts at 204–206° C.

A suspension of 7.6 g. of lithium aluminium hydride in a mixture of 50 cc. of tetrahydrofurane and 100 cc. of benzene is placed in a stirrer-type flask and a solution of 18 g. of o-diethylaminoacetyl amino-diphenyl methane in 200 cc. of benzene is added dropwise thereto. After the reaction has subsided, the mixture is heated for another hour on a steam bath, then mixed with water and sodium hydroxide solution and the organic layer is separated. This is evaporated, and the pale yellow oily residue is dissolved in 100 cc. of 2 N acetic acid and the acid solution is filtered. The filtrate is made alkaline and then submitted to extraction with ether, and the extract is evaporated. When distilled under a high vacuum of 0.05 mm. pressure, the residue yields 14.9 g. of o-diethyl aminoethyl amino-diphenyl methane, which distills over at 151–153° C. The hydrochloride of the base melts at 139–140° C.

By reacting the aforementioned base with formaldehyde and formic acid, there is obtained o-N-2-diethyl aminoethyl N-methyl-diphenyl methane, which boils at 133–136° C. at a pressure of 0.02 mm. and the hydrochloride of which melts at 122–124° C. The quaternary salt is obtained from the amine with dimethyl sulphate, which salt melts at 65° C. when dissolved in and recrystallised from an acetone/ether mixture.

Example 4

In a similar manner to that described in Example 3, it is also possible to start with o-N-methyl amino-diphenyl methane, to react the latter with chloroacetyl chloride to form o-N-chloroaceto-N-methylamino diphenyl methane (M. P. 53–54° C. from an ether/petroleum ether mixture), to react this product with diethylamine to form o-N-diethylamino-acetyl-N-methyl amino-diphenyl methane (B. P. 0.02 mm.: 148–150° C.) and then to subject this last mentioned substance to a reduction treatment.

Example 5 o - N - ethyl - N - pyrrolidinoethyl - amino - diphenyl methane, boiling at 136–137° C. at a pressure of 0.015 mm., is obtained from o-N-ethyl amino-diphenyl methane and β-pyrrolidinoethyl chloride.

Example 6 o-N-propyl-N-piperidinoethylamino-diphenyl methane, boiling at 145–147° C. at a pressure of 0.03 mm., is obtained from o-N-propylaminodiphenyl methane and piperidinoethyl chloride.

Example 7

30 g. of o-methylamino-diphenyl methane and 8 g. of sodamide are heated in an oil bath in 200 g. of xylene while stirring. A free base is produced from 39 g. of 1-methyl-3-bromomethyl pyrrolidine hydrobromide with the aid of 100 cc. of saturated potassium carbonate solution, and this base is taken up in 200 cc. of xylene and the xylene solution is dried. The dry solution of the base is added dropwise to the boiling solution of the amino-diphenyl methane compound. The separation of sodium bromide is complete after one hour. The mixture is cooled and then mixed with 100 cc. of aqueous 2 N sodium hydroxide solution. The xylene layer is separated off and evaporated. The residue is dissolved in 400 cc. of 1 N acetic acid, any unreacted amino-diphenyl methane crystallising out after a time. After these crystals have been filtered off, the filtrate is made alkaline and the oil separating out is taken up in ether. After drying, the ether is evaporated off and the residue subjected to high vacuum distillation. There are obtained 17 g. of a thinly liquid slightly yellowish oil as a main fraction (B. P. 0.02 mm.: 146° C.). The o-N-(1-methyl pyrrolidyl-3-methyl)-N-methyl amino-diphenyl methane thus obtained is dissolved in absolute ether and the hydrochloride is precipitated with ethereal hydrochloric acid. After being dissolved in and recrystallised from acetone/ether, this hydrochloride melts at 133–135° C.

The methosulfate, which melts at 80–81° C. when dissolved in and recrystallised from an acetone/ether mixture, is obtained from the base by using dimethyl sulphate.

Example 8

As described in the aforegoing example, 1-(3'-dimethyl aminopropyl) - 1-aza-[2,3:5,6] - dibenzocycloheptadiene, which boils at 141–143° C. at a pressure of 0.1 mm., is obtained from 100 g. of 1-aza-[2,3:5,6]-dibenzocycloheptadiene, 31 g. of sodamide and 122 g. of 3-dimethyl-amino-propyl chloride by boiling the reactants for several hours in xylene. The yield is 49 g. The hydrochloride of the base is obtained by reacting ethereal hydrochloride acid with a solution of the base in ether. The hydrochloride can be dissolved in and recrystallised from absolute ethanol/ether mixture and melts at 176–178° C.

*Example 9*

In a similar manner, it is possible to obtain 1-(2'-diethylaminoethyl) - 1 - aza - [2,3:5,6] - dibenzocycloheptadiene if the aza-dibenzocycloheptadiene is reacted with diethylaminoethyl chloride in the presence of sodamide in xylene. This new base boils at 140–145° C. at a pressure of 0.01 mm.

*Example 10*

17.8 g. of aza-dibenzocycloheptadiene and 9.2 g. of triethylamine are dissolved in 150 cc. of tetrahydrofureane and this solution is added dropwise and while stirring to a solution of 11.3 g. of chloroacetyl chloride in 100 cc. of dioxane. The mixture is stirred for several hours at 20° C., then mixed with water and concentrated by evaporation to a volume of approximately 100 cc. After cooling, the chloroacetyl derivative precipitates in the form of crystals. It is filtered off with suction and dissolved in and recrystallised from ethanol. There are obtained 19.3 g., i. e. 78% of the theoretical, of 1-chloracetyl-aza-[2,3:5,6]-dibenzocycloheptadiene, which melts at 137–138° C.

By boiling 16 g. of the aforementioned chloracetyl derivative with 18.3 g. of diethylamine for 2 hours in 100 cc. of dioxane, there is obtained the diethylaminoacetyl derivative, which boils at 180–181° C. at a pressure of 0.03 mm. The yield is 13.5 g., i. e. 74% of the theoretical. The hydrochloride of the novel compound melts at 100° C.; it dissolves readily in water, ethanol and acetone, but less readily in ether.

10 g. of the diethyl aminoacetyl base obtained in this manner are reduced in tetrahydrofurane with 3.1 g. of lithium aluminium hydride. After working up, there are obtained 7,5 g. of 1-(diethylaminoethyl)-aza-[2,3:5,6]-dibenzocycloheptadiene, which boils at 140–145° C. at a pressure of 0.01 mm.

*Example 11*

1 - (3' - pyrrolidinopropyl) - aza - dibenzocycloheptadiene, which boils at 151–153° C. at a pressure of 0.01 mm., is obtained from 1-aza-[2,3:5,6]-dibenzocycloheptadiene and 3-pyrrolidinopropyl chloride in the presence of sodamide. The following 1-aza-[2,3:5,6]-dibenzocycloheptadiene derivatives are obtained in analogous manner:

1-(3'-piperidino-propyl), B. P. 0.02 mm.: 165–166° C.
1-(2'-pyrrolidinopropyl), B. P. 0.01 mm.: 152–153° C.
1-(3'-diethylaminopropyl), B. P. 0.015 mm.: 161–162° C.
1-[2'-(1"-methyl-piperazinyl)-ethyl], B. P. 0.01 mm.: 160–163° C.
1-(2'-morpholinoethyl), B. P. 0.03 mm.: 161–164° C.

What we claim is:

1. A new chemical compound of the group consisting of 1-aza-[2,3:5,6]-dibenzocycloheptadiene derivatives, and hydrochloric acid addition salts of said derivatives, said derivatives having the formula

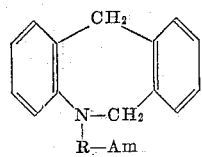

wherein —R—Am is selected from the group consisting of the di-lower alkyl-amino-lower alkyl group, the N-pyrrolidino-lower alkyl group, the N-piperidino-lower alkyl group, the N-morpholino-lower alkyl group, the 1-lower alkyl-piperazinyl-4-lower alkyl group, and the 1-lower alkyl pyrrolidyl-3-methyl group.

2. 1 - (2' - diethylaminoethyl) - 1 - aza - [2,3:5,6]-dibenzocycloheptadiene of the formula

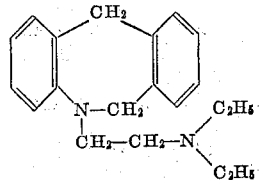

3. 1 - (3' - dimethylaminopropyl) - 1 - aza - [2,3:5,6]-dibenzocycloheptadiene of the formula

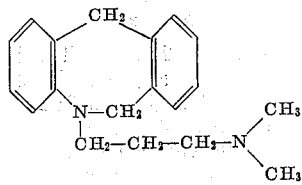

4. 1 - (3' - pyrrolidino - propyl) - aza - dibenzocycloheptadiene of the formula

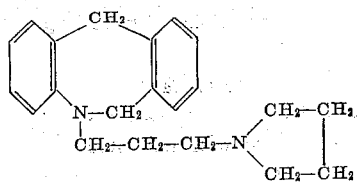

5. 1 - (3' - diethylaminopropyl) - 1 - aza - [2,3:5,6]-dibenzocycloheptadiene of the formula

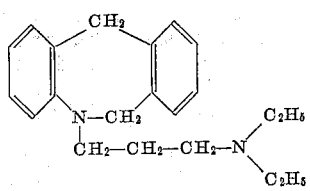

6. 1 - [2' - (1" - methyl - piperazinyl) - ethyl]-1-aza-[2,3:5,6] - dibenzocycloheptadiene of the formula

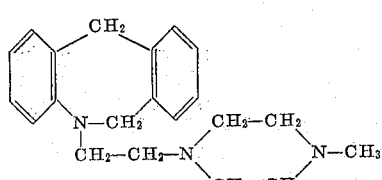

References Cited in the file of this patent
UNITED STATES PATENTS

| | | |
|---|---|---|
| 2,554,736 | Haefliger et al. | May 29, 1951 |
| 2,619,484 | Wenner | Nov. 25, 1952 |
| 2,764,580 | Schindler et al. | Sept. 25, 1956 |